June 14, 1966 C. BERGER 3,256,109
METAL FORMATION WITHIN A SUBSTRATE
Filed Dec. 20, 1962
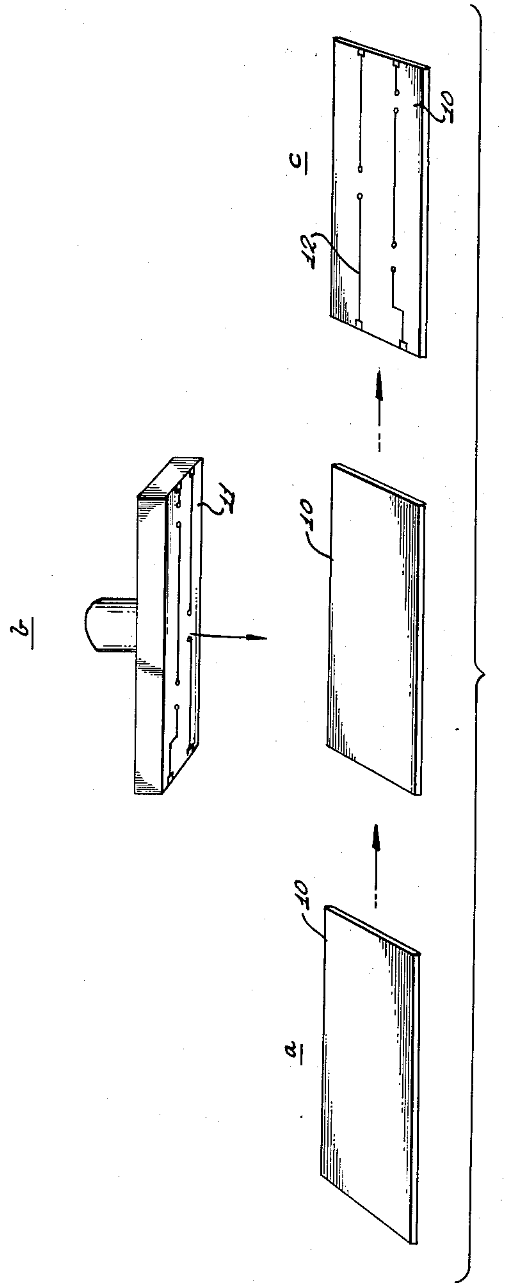
INVENTOR.
CARL BERGER
BY Lyon, Patton, Rieber
Lee, and Utecht
ATTORNEYS United States Patent Office 3,256,109
Patented June 14, 1966

3,256,109

METAL FORMATION WITHIN A SUBSTRATE

Carl Berger, 18 Cooke Road, Lexington, Mass.

Filed Dec. 20, 1962, Ser. No. 245,990
13 Claims. (Cl. 117—38)

This invention relates to a method of producing metals such as aluminum, Group VIA metals, nickel and iron at least partially imbedded within a solid material. More particularly, the invention is directed to process comprising the thermal decomposition of a heat decomposable metal-containing compound previously dissolved or suspended within said solid material.

Methods for producing metal films and deposits within solids such as plastics are rare. Most techniques involve systems for depositing metal films on the surface of a substrate by conventional techniques such as vacuum deposition, electrodeposition, and gas plating (Davis, U.S. Patent 2,599,978 and Lander, U.S. Patent 2,671,739). Another more recent development is the heat decomposition of certain metal organic compounds as a film on the surface of a substrate as disclosed in applicant's U.S. Patent No. 3,041,197, issued on June 28, 1962. All such techniques involve only surface deposition and none have encompassed deposiiton at least partially or completely within the solid substrate. The only means heretofore for incorporating metal at least partially within a substrate has been to mix metal powders or granules with a precursor of plastic, wax, and other solids prior to solidification. This does not result in a continuous metal conduit through the plastic or other non-conductor medium, and the resultant mass for instance is only a poor electrical conductor unless the metal loadings are extremely large.

The present invention utilizes metal decomposition techniques similar to those described in C. Berger, U.S. Patent 3,041,197 referred to above and in U.S. application 225,370, filed September 21, 1962.

While the initial heating of a system in true solid solution is preferred, an emulsion or suspension of the heat decomposable compound in a solid is also contemplated. Such suspensions are included within the scope of the present invention. Additives may be dissolved or suspended in the precursor phase to the solid substrate to alter the chemical and physical characteristics of the metal formed from the heat decomposable compound. The term "precursor" is used herein and in the claims in its broadest sense, to mean the immediate forerunner of the solid substrate in question. Thus, the precursor of a solid substrate may be chemically the same substrate but in liquid form, or it may be the uncured substrate or unreacted materials, which upon reaction, formed the substrate.

An object of this invention is to provide a method for producing metal at least partly imbedded in the surface of a plastic or resin, within the plastic or resin, or other solids. Such plastics or resins may be conventional polymers such as methyl methacrylate, polyacrylonitrile, resins such as epoxy types, or solids such as waxes, sulfur, gels, putty, etc.

Another object of this invention is to provide an inexpensive means for producing metal within a solid body or on the surface of a solid body by heaitng the solid substrate, containing a heat decomposable metal compound and decomposing said compound to cause metal formation within the substrate and, if desired, imbedded on the surface thereof.

Another object of this invention is to provide an inexpensive means for providing an electrically conductive bridge between two separated electrically conductive materials.

Another object of this invention is to provide a continuous electrically conductive conduit within a non-conductor.

Another object of this invention provides for the production of a metal on the surface or within a solid by application of heat generated by various sources (e.g., torch, concentrated sun light, lasers).

Another object of this invention is to produce thin metal coating on the surfaces of solids such as polymethylmethacrylate, glass, and steel.

These and other objects and advantages of this invention will become apparent upon reading the following description.

I have now found a process for the production of a metal on a surface or within a substrate which comprises generally subjecting a substrate, in which a heat decomposable metal compound capable of decomposing under heat to produce a metal has been placed, to heat, thereby producing metal films firmly imbedded on the surface or within the substrate itself or both.

My invention further includes a process for producing a metal on a surface or within a substrate which comprises dissolving or suspending within a liquid precursor of the solid substrate a heat decomposable metal compound capable of decomposing under heat to produce said metal during formation of said solid substrate, heating said surface or interior of substrate to a temperature sufficiently high to decompose the heat decomposable metal compound, thereby producing metal on the surface or interior of the substrate. The character of the applied heat can take any suitable form.

The production of metal films on the surface or within various substrates is of much practical value. Various corrosion susceptible materials may be coated with aluminum, chromium, or zinc. Non-electrical conducting materials such as ceramics, resins, glass or plastics may be made electrically conductive by producing films imbedded on a surface or within a substrate. In addition, specific decorative effects may be achieved by the production of metal patterns on surfaces or within substrates.

Typical of metal compounds capable of decomposing under heat to liberate metal are aluminum alkyls and metal carbonyls, for instance, Group VIB metal carbonyls. Typical of these materials and preferred because of availability and cost considerations are aluminum tri-isobutyl, aluminum triethyl, gallium tripropyl, zinc diethyl, chromium carbonyl, molybdenum carbonyl, and tungsten carbonyl which constitute Group VIB metal carbonyls, nickel carbonyl, iron carbonyl, silicon hydride, platinum acetylacetonate.

Generally operative are all heat decomposable metal compounds capable of decomposing under heat to form a metal and which can be dissolved or suspended in a precursor to a solid or semi-solid substrate. Practically speaking the range from about ambient to about 1000° C. is the preferred operating range since this includes the most heat decomposable metal compounds capable of yielding metal upon heat treatment.

The use of the metal compounds in solution or suspension eliminates a safety hazard found in use of pure metal compounds in gas plating and high temperature reduction techniques.

I have found, as described in C. Berger U.S. Patent 3,041,197 and application 225,370 (September 21, 1962), that when a heat decomposable compound is dissolved in a substrate, the state of molecular aggregation of the heat decomposable compound is altered and then the temperature of decomposition is also altered, e.g., aluminum tri-isobutyl in paraffin wax starts to decompose 40–50 degrees centigrade lower than in its pure state.

One special advantage of the present process results in that the metal produced within the substrate is protected from oxidative tarnishing or other degradative effects since the environment does not have access to the formed metal when the latter is totally submerged within the substrate.

Typical of materials within which the heat decomposable compound may be placed are metals, plastics, glasses, ceramics, waxes, and semi-solids such as putties, vaseline, etc.

The incorporation of various minor components in the substrate causes modification, where desired, of the physical and chemical property of the metal produced by thermal decomposition. Such agents are wetting agents (to promote adhesion) and oxidizing and reducing compounds. Typical of these are calcium phenyl stearate, polydimethylsiloxane, lead soaps, $Na_2S_2O_3$, $H_2O_2$, $KMnO_4$, $LiAlH_4$, $H_2$, $O_2$, peracetic acid, and others.

Incorporation of heat decomposable metal compounds into substrates may be performed in a number of ways. For instance they may be incorporated into low melting glasses while they are in fluid state, or incorporation may occur during the molten state of waxes or thermoplastic polymers. One particularly suitable procedure is to incorporate metal producing substances into monomers or resin precursors before polymerization or curing occurs.

The actual decomposition of the metal compound may be performed in a number of ways. If the substrate, in which the heat decomposable metal compound is dissolved, is transparent then focused sunlight may be used to produce intense heat within substrate thereby causing local metal formation, or alternatively laser beams may be projected through the transparent plastic causing thin thread-like metal formation within the transparent substrate.

Another technique involves contacting the surface of a substrate, in which a heat decomposable compound is dissolved, viz., aluminum tri-isobutyl, with a heated die or other pattern. At the point of contact aluminum is formed, partly imbedded in the surface.

Other suggested means of heating are electrical resistance and dielectric heating.

The temperatures which must be attained will vary with the heat decomposable metal compound. For instance, aluminum triethyl decomposes in the range 260–310° C., molybdenum carbonyl 120–160° C., iron carbonyl 60–140° C., dibutyl magnesium 170–190° C., and dimethylcadmium at 212–337° C.

The thickness of the films partly imbedded on the surface of a substrate will be a function of time of heat application and under experimental conditions has been varied from .0005 inch to .005 inch. Within the substrate the thickness of metal produced will be a function of the area exposed to lasers, concentrated infra red, or other heat sources.

The concentration of the heat decomposable metal compound can vary from a few percent up to a point in a putty, for example, where said compound is predominant by weight of all materials present. Since some forms of putty could be used for soldering, large quantities of metal must be decomposed in order to insure electrical conductivity.

It will be apparent that production of the metal occurs when the proper temperature has been attained which may be a matter of a fraction of a second to a few minutes.

A representative step-wise illustration of one preferred form of process of my invention is shown in the figure. In *a* of the figure, a clear sheet 10 of polymethylmethacrylate is shown in which aluminum tri-isobutyl is dissolved. In *b* of the figure, a heated die 11, having the form of a desired circuit configuration, is being impressed upon the sheet 10, and in *c* of the figure, the resulting aluminum printed circuit 12 is shown impressed into the sheet 10. One specific mode of making the sheet 10 and printed circuit is given in Example 5 hereafter.

The following examples illustrate the novel processes and compositions of the present invention.

*Example 1*

To 100 parts by weight of an epoxy (Epon 820) resin is added 25 parts by weight of $Cr(CO)_6$ (a Group VIB metal carbonyl) and 9 parts by weight of diethylene triamine. The mixture is stirred for two minutes and then poured into a flat pan. The thickness of the mix is about 0.10" and after room cure for 24 hours the pale yellow resin is removed from pan. A heated platen was pressed against the surface of the resin so as to heat approximately .005" of top to about 140° C. A conductive coating of chromium forms on surface of the resin and provides a conductive surface for use as an electrode.

*Example 2*

Following the procedure of Example 1 except that 25 parts by weight of $W(CO)_6$ are used instead of $Mo(CO)_6$, a heated die in the form of a printed circuit was pressed against the resin so that .005" of top surface is heated to about 175° C. This operation took about 3–5 minutes. A printed circuit of tungsten (a Group VIA metal) on the resin resulted.

*Example 3*

To 100 parts by weight of polyvinyl chloride paste resin such as Geon 121 and 80 parts by weight dioctyl phthalate is added 100 parts by weight of aluminum tri-isobutyl. The paste is ground into dispersion and stirred for 30 minutes to get a homogeneous mass. This mass is ladled into a one-inch thick section in a pan and heated for one hour at 100° C. A clear plastisol resulted and was removed from pan. A heated die having a bird engraved in it was pressed against the plastisol so that .001" of surface was exposed to a temperature of 210° C. for 30–90 seconds. A beautiful pattern was produced on the plastisol.

*Example 4*

One hundred parts by weight of a low melting glass (300–350° C.) is liquefied and 5 parts of Pt acetylacetonate is suspended in the melt and the glass allowed to cool. A propane torch is uniformly played over the surface of the glass so that the surface to a depth of .001" attains a temperature of about 375° C. The torch is removed and a black catalytic deposit of Pt is noted on surface which can be used in hydrogenation reactions. Similar procedures are utilized with low melting ceramics.

*Example 5*

One hundred parts by weight of methyl methacrylate is placed in a covered tray. The monomer has had previously dissolved in it 0.2% of benzoyl peroxide. To this mixture is added twenty five parts by weight of aluminum tri-isobutyl. After stirring, the entire mass is heated at 50–60° C. overnight and then heated for four hours at 100° C. A clear sheet of polymethylmethacrylate results. After removal from the tray a die heated to 250° C. was brought into contact with the surface and an aluminum printed circuit was formed.

*Example 6*

Utilizing the mixture of Example 5 a thin layer (.001") was calendered onto a piece of stainless steel and the mixture polymerized as described in Example 5. Upon heating the stainless steel to 200° C. a thin layer of aulminum formed on the surface of the steel serving as a protective barrier for the steel and the intermediate layer of the polymethylmethacrylate on the surface serves as a protective barrier for both steel and aluminum.

*Example 7*

Fifty parts by weight of crepe natural rubber, fifty parts by weight of GR–S(X–274) synthetic rubber, 1.0 part of alkylated polyhydric phenol and 600 parts of heptane are mixed to form a solution. Into the solution is poured 50 parts of iron pentacarbonyl. This solution is applied to cellophane tapes to produce a colorless pressure senstitive adhesive. A 3" piece of tape is applied to an aluminum surface and a ruby laser held vertical to the tape surface. Upon actuation of the laser, discrete pinpoint patterns are produced by moving tape slowly under the laser. The patterns are dark clusters of iron produced by laser radiation.

*Example 8*

The same procedure is followed as in Example 7 except that .02 part of $H_2O$ is added to the solution prior to application to tape. Upon actuation by the laser some $Fe_3O_4$ is formed along with clusters of iron.

*Example 9*

One hundred parts by weight of a typical ST polysulfide polymer is mixed with fifty parts by weight of an oxidizer such as ammonium perchlorate and with twenty-five parts by weight of aluminum tri-isobutyl. The ST polysulfide polymer is a prepetized rubber which requires no additional softening for processing. This product is proprietary with Thiokol Corporation, and information as to properties can be found in Thiokol Bulletin CR–4. The mass is poured into an open metal tube 1" in diameter and cooled. Upon ignition of one end of enclosed mass a violent thrust caused the metal tube to rise from its stand.

*Example 10*

To one hundred parts by weight of a melted wax-polyethylene composite are added 150 parts by weight of aluminum triethyl. The mixing of the mass results in a putty. A small piece of putty is used to join two pieces of wire from the same circuit. The putty is flamed thoroughly causing a massive metal deposit. The ammeter in the circuit indicates that the two wires have been joined.

*Example 11*

The procedure of Example 5 was followed except that 0.25% of calcium phenyl stearate was added prior to polymerization. Microscopic study of the deposited metal showed a finer dispersion of the metal in the plastic.

*Example 12*

The procedure of Example 4 was followed except that 1 gram of $LiAlH_4$ was added to melt prior to solidification. Electrochemical tests of the catalytic deposit indicated the presence of H atoms dissolved in the platinum.

*Example 13*

One hundred parts of an alloy of lead and bismuth in a ratio of 40:60 by weight was held at 130° C. where it is molten and 25 parts of $W(CO)_6$ (a Group VIB metal carbonyl) added. The mass was poured into a mold and the mold cooled. The mold was flash heated at 200° C. for 15–30 seconds by immersion in a glycerin bath. After rapid removal and cooling, the mold was removed and a protective coating of W on the Pb-Bi object was noted.

In conducting the general process of this invention it is required that enough heat be provided to decompose the heat decomposable compound to produce the required metal. This will vary with the compound, e.g., aluminum triethyl must be heated to above 260° C. and molybdenum carbonyl must be heated to above 120° C. In order to expedite the rate of metal formation, the substrate in which the heat decomposable compound is placed may be raised in temperature to a point below the decomposition range of the metal producing heat decomposable compound.

Moreover the substrate in which metal deposition is to occur must be chosen so that it does not appreciably decompose in the temperature range of metal production. In addition, when the heat decomposable metal compound is placed in a monomer or precursor system for a resin or a plastic, the heat or curing or polymerization must be kept below the heat decomposition range of the heat decomposable metal compound.

It is possible of course to produce metal deposits of varying characteristics by incorporating two or more metal producing heat decomposable compounds in a substrate, for instance, molybednum carbonyl and iron carbonyl.

The quantity of metal producing heat decomposable compound incorporated will vary with the function of the end product. For catalysis, as illustrated in Example 4, only 5% by weight is need to produce a catalytic surface since electrical continuity is not needed. In Example 5, 25% by weight is used so that the printed circuit can have the electrical continuity. Finally in a putty used for soldering (Example 10) it is observed that 60% by weight of a heat decomposable compound is required to provide a connection with low electrical resistance.

The extent of metal deposition in a substrate or on a surface can be controlled by the duration of the application of the heat source. In Example 3 when the heat is applied for 180 seconds the depth of deposition is increased about 50%.

It is also noted that the process may be used to initiate catalytic reactions (Example 9). For instance, it is known that a mixture of polyurethane and ammonium perchlorate forms an efficient solid propellant. It is also known that the incorporation of finely divided highly active aluminum metal increases the thrust of this propellant. However it is difficult and dangerous to incorporate this type of aluminum. The incorporation of, for instance, aluminum tri-isobutyl in the solid propellant would simplify the preparation process. After ignition of the propellant the heat waves would cause progressive production of aluminum in advance of the combustion thereby yielding a higher specific impulse to the propellant.

It is also to be noted that the method of Example 8 may be used to produce a pattern of magnetic particles in a tape which can then serve as a record of the laser pattern and can be replayed on a tape recorder or other device suitable for detecting the presence of $Fe_3O_4$.

The present process may be performed under ordinary atmospheric conditions or under other gaseous atmospheres as required such as insert gases.

My invention may therefore be used to form printed circuits (Examples 1, 2, 5), to solder (Example 10), to produce decorative patterns (Example 3), magnetic tape patterns (Example 8), etc.

The invention may be further developed within the scope of the following appended claims. Accordingly it is understood that the foregoing description is merely illustrative of an operative embodiment of this invention and not in a strictly limiting sense.

Having fully described the method herein, I now claim:

1. A process for the production of a metal at least partly imbedded in a solid substrate which comprises uniformly admixing an organometallic compound, capable of decomposing under heat alone to liberate said metal, with a fluid precursor of a solid substrate, stable at temperatures in the heat decomposition range of said heat decomposable metal compound, solidifying said fluid precursor after it has been admixed with said organometallic compound and prior to the heating of said solid precursor to decompose said organometallic compound, and heating at least some portion of the solid substrate-organometallic compound composition to the heat decomposition temperature of said organometallic compound but below the temperature at which any substantial change in state in the solid substrate occurs.

2. The process of claim 1 wherein the organometallic compound is dissolved in the solid substrate before heating the same to its decomposition temperature.

3. The process of claim 1 wherein the organometallic compound is suspended in the solid substrate before heating the same to its decomposition temperature.

4. The method of claim 1 wherein the organometallic compound is a metal alkyl.

5. The method of claim 1 wherein the organometallic compound is a metal carbonyl.

6. The method of claim 1 wherein the solid substrate is selected from the group consisting of plastics, and ceramics.

7. The method of claim 6 wherein the solid substrate is polymethylmethacrylate.

8. The method of claim 6 wherein the solid substrate is an epoxy resin.

9. The process of claim 1 wherein said compound contains an oxidizing agent reactive with said metal liberated from said organometallic compound.

10. The process of claim 1 wherein said compound contains a reducing agent reactive with said metal liberated from said organometallic compound.

11. The process of claim 1 wherein said compound contains a wetting agent.

12. A process for the production of aluminum at least partly imbedded in a solid substrate which comprises, uniformly admixing an aluminum alkyl compound, capable of decomposing under heat to liberate aluminum, with the fluid precursor of a solid substrate, stable at temperatures in the heat decomposition range of said heat decomposable aluminum alkyl, solidifying said fluid precursor after it has been admixed with said aluminum alkyl and prior to the heating of said solid precursor to decompose said aluminum alkyl, and heating at least some portion of the solid substrate-aluminum alkyl composition to the heat decomposition temperature of said aluminum alkyl but below the temperature at which any substantial change in state in the solid substrate occurs.

13. A process for the production of Group VIB metal at least partly imbedded in a solid substrate which comprises, uniformly admixing a Group VIB metal carbonyl compound capable of decomposing under heat to liberate a Group VIB metal, with the fluid precursor of a solid substrate, stable at temperatures in the heat decomposition range of said heat decomposable Group VIB metal carbonyl, solidifying said fluid precursor after it has been admixed with said metal carbonyl and prior to the heating of said solid precursor to decompose said metal carbonyl, and heating at least some portion of the solid substrate-Group VIB metal carbonyl to the heat decomposition temperature of said Group VIB metal carbonyl but below the temperature at which any substantial change in state in the solid substrate occurs.

References Cited by the Examiner

UNITED STATES PATENTS

| | | | |
|---|---|---|---|
| 1,939,232 | 12/1933 | Sheppard et al. | 117—38 XR |
| 2,785,082 | 3/1957 | Clough et al. | 117—107.2 XR |
| 2,930,767 | 3/1960 | Novak | 117—107.1 |
| 2,979,424 | 4/1961 | Whitehurst et al. | 117—46 |
| 3,014,818 | 12/1961 | Campbell | 117—227 |
| 3,031,340 | 4/1962 | Girardot | 117—227 XR |
| 3,041,197 | 6/1962 | Berger | 117—160 XR |

RICHARD D. NEVIUS, *Primary Examiner.*

JOSEPH B. SPENCER, *Examiner.*

C. A. HAASE, A. GOLIAN, *Assistant Examiners.*